United States Patent
Chang et al.

(10) Patent No.: US 8,421,671 B2
(45) Date of Patent: Apr. 16, 2013

(54) ALTERNATE RADIO TRANSMITTER AND METHOD FOR OPERATING THE SAME

(75) Inventors: Yu-Cheng Chang, Taoyuan County (TW); Yu-San Lin, Taoyuan County (TW); Feng-Yu Chang, Taoyuan County (TW)

(73) Assignee: Chung-San Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 237 days.

(21) Appl. No.: 12/960,472

(22) Filed: Dec. 4, 2010

(65) Prior Publication Data

US 2012/0092216 A1    Apr. 19, 2012

(30) Foreign Application Priority Data

Oct. 15, 2010   (TW) ................. 99135355 A

(51) Int. Cl.
*G01S 19/11* (2010.01)
*G01S 19/03* (2010.01)

(52) U.S. Cl.
USPC ................ 342/357.48; 342/357.4

(58) Field of Classification Search ......... 342/357.4, 342/357.48, 357.75, 357.76; 701/468; 375/373, 375/376

See application file for complete search history.

(56) References Cited

U.S. PATENT DOCUMENTS

| | | | | |
|---|---|---|---|---|
| 5,969,673 A | * | 10/1999 | Bickley et al. | 342/357.59 |
| 6,002,363 A | * | 12/1999 | Krasner | 342/357.77 |
| 2008/0317188 A1 | * | 12/2008 | Staszewski et al. | 375/376 |

* cited by examiner

*Primary Examiner* — Dao Phan
(74) *Attorney, Agent, or Firm* — Jackson IPG PLLC

(57) ABSTRACT

An alternate radio transmitter includes a processor, a modulator, a PLL unit and a radio transmission unit. The processor provides a digital signal. The modulator modulates the digital signal, thus providing at least two modulated signals. The PLL unit mixes the modulated signals, thus providing an output signal. The radio transmission unit transmits the output signal.

8 Claims, 4 Drawing Sheets

ALTERNATE RADIO TRANSMITTER AND METHOD FOR OPERATING THE SAME

BACKGROUND OF INVENTION

1. Field of Invention

The present invention relates to an alternate radio transmitter and a method for operating the same and, more particularly, to a radio transmitter for transmitting data including global positioning system ("GPS") data.

2. Related Prior Art

After a sea wreck or airplane crash, searching is conducted for survivors, bodies, and wrecks of a ship or airplane. The area wherein the searching is to be conducted is determined in two manners. The area is determined to be the spot where the ship or airplane is detected by radar the last time. Alternatively, the area is determined to be the spot where a SOS signal is sent from the ship or airplane the last time. A rescue team is sent to the area. However, there are only about 72 hours for any survivors to be saved. After that, the chance for the survivors to be rescued is slim. The chance would be even lower if there is hypothermia due to bad weather or freezing cold sea water. Hence, it is important to know where to conduct such searing soon. It is however difficult to use radar to detect the wrecks, particularly those of the airplane which are often scattered.

A personal location beacon ("PLB") is helpful for a rescue team to locate a survivor or body in a sea wreck or airplane crash. The PLB includes a 121.5 MHz module and a 406 MHz module and therefore operates based on two frequencies: 121.5 MHz and 406 MHz, and transmits signals via a satellite. Hence, the PLB includes a complicated circuit. The 121.5 MHz module includes a direction finder to search for sound-guided signals. In a phase modulation ("PM") manner, the 406 MHz module transmits GPS signals to and saves the GPS data in a GEOSAR. The GEOSAR transfers the GPS data to a local user terminal ("LUT"). However, the GEOSAR sends the GPS data to an LUT only when it reaches one. It might take a lot of precious time for the GEOSAR to reach an LUT. Moreover, the cost of the installation and maintenance of the LUT is high. For example, each LUT must join the COSPAS-SARSAT.

There is another method for transmitting GPS signals, i.e., the wireless communication. For example, GSM or GP RS can be used to transmit data. The primary problem with the wireless communication lies in the installation of a huge number of stations. Service providers build the stations and hence control the quality and cost of the wireless communication. There are inevitably areas that are not covered by the stations such as sea areas more than 10 kilometers from coasts. In these areas, it is impossible to use a cell phone to send an SOS signal for in-time rescue.

The present invention is therefore intended to obviate or at least alleviate the problems encountered in the prior art.

SUMMARY OF INVENTION

It is the primary objective of the present invention to provide an alternate radio transmitter for transmitting data including GPS data.

To achieve the foregoing objective, the alternate radio transmitter includes a processor, a modulator, a PLL unit and a radio transmission unit. The processor provides a digital signal. The modulator modulates the digital signal, thus providing at least two modulated signals. The PLL unit mixes the modulated signals, thus providing an output signal. The radio transmission unit transmits the output signal.

The alternate radio transmitter may further include a GPS receiver for receiving GPS data and sending the GPS data to the processor.

The modulated signals may include an AM signal and a FSK signal. The FSK signal may include the GPS data. The AM signal may be mixed with the FSK signal at a time ratio of 2:1.

In another aspect of the present invention, there is provided a method for operating an alternate radio transmitter. The method includes the steps of providing a GPS receiver for receiving GPS data, providing a processor for receiving the GPS data and providing a digital signal including the GPS data, providing a modulator for modulating the digital signal to provide at least two modulated signals, providing a PLL unit for mixing the modulated signals to provide an output signal, and providing a radio transmission unit for transmitting the output signal.

In the method, the modulated signals may include an AM signal and a FSK signal. The FSK signal may include the GPS data. The AM signal may be mixed with the FSK signal at a time ratio of 2:1.

In another aspect of the present invention, there is provided a method for executing a rescue mission. The method includes the step of using an alternate radio transmitter to send an output signal for help. The alternate radio transmitter includes a processor, a modulator, a PLL unit and a radio transmission unit. The processor provides a digital signal. The modulator modulates the digital signal, thus providing an AM signal and a FSK signal including GPS data. The PLL unit mixes the AM signal with the FSK signal, thus providing the output signal. The radio transmission unit transmits the output signal. The method further includes the steps of using an AM receiver to receive the AM signal to determine a direction for the rescue mission and using an FSK receiver to receive the FSK signal to determine a precise location for the rescue mission.

Other objectives, advantages and features of the present invention will be apparent from the following description referring to the attached drawings.

BRIEF DESCRIPTION OF DRAWINGS

The present invention will be described via detailed illustration of three embodiments referring to the drawings wherein.

DETAILED DESCRIPTION OF EMBODIMENTS

Figure 1:
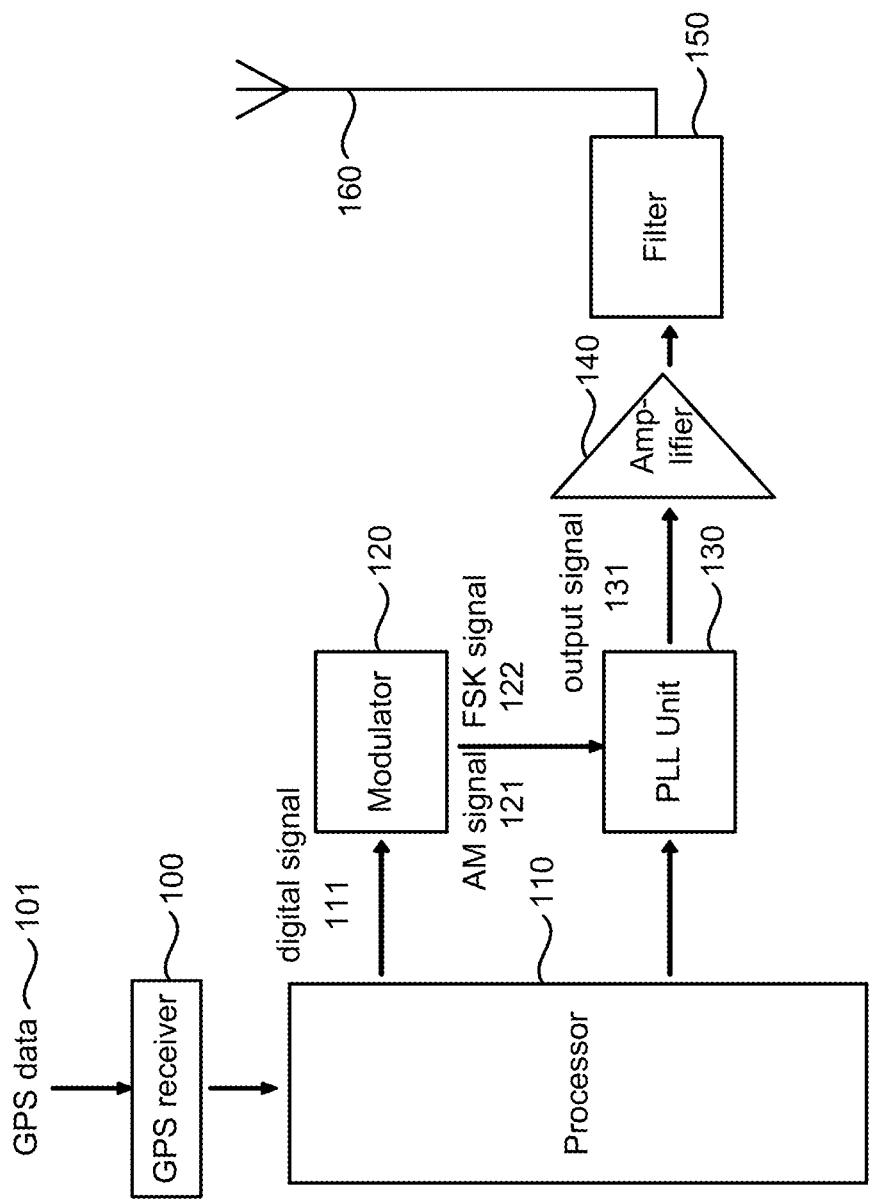
FIG. 1 is a block diagram of an alternate radio transmitter according to the first embodiment of the present invention.

Referring to FIG. 1, an alternate radio transmitter includes a GPS receiver 100, a processor 110, a modulator 120, a phase-locked loop ("PLL") unit 130 and a transmission unit according to a first embodiment of the present invention. The GPS receiver 100 receives GPS data 101 from a satellite. The GPS data 101 include location data. For example, the GPS data 101 is useful in locating a victim of a sea wreck.

The processor 110 such as an IC controls the other elements and produces a digital signal 111 including the GPS data 101. The processor 110 can include the GPS receiver 100, or the GPS 100 can be made independent of the processor 110.

The modulator 120 modulates the digital signal 111. By the modulation, the digital signal 111 is transformed to a waveform suitable for a channel. The modulation is based on the amplitude, phase and/or frequency. For instance, the modulator 120 produces an amplitude modulation ("AM") signal 121 by modulating the amplitude of the digital signal 111 and, by subjecting the digital signal 111 to frequency shift keying ("FSK"), produces a FSK signal 122. The AM signal 121 carries sound data. The AM signal 121 is a medium wave ("MW") signal and travels far to carry an SOS message for a long distance. The FSK signal 122 includes the GPS data 101. The FSK signal 122 carries data in the binary system at two frequencies near the carrier wave frequency. That is, one of the frequencies is taken as "0" while the other frequency is taken as "1." The FSK signal 122 carries the GSM data 101, i.e., the data about the precise location of the alternate radio transmitter. However, the FSK signal 122 does not travel far.

The PLL unit 130 produces an output signal 131 by mixing two modulated signals such as the AM signal 121 and the FSK signal 122.

The transmission unit preferably includes an amplifier 140, a filter 150 and an antenna 160. The amplifier 140 amplifies the output signal 131. The filter 150 filters the amplified output signal 131. The antenna 160 transmits the filtered amplified output signal 131.

In assembly, the GPS receiver 100, the modulator 120 and the PLL unit 130 are connected to the processor 110. Furthermore, the PLL unit 130 is connected to the modulator 120. The amplifier 140 is connected to the PLL unit 130. The filter 150 is connected to the amplifier 140. The antenna 160 is connected to the filter 150.

Communication is based on an open VHF/UHF frequency according to the first embodiment of the present invention. Two types of modulation are used, i.e., AM and FSK. At first, the processor 110 produces the digital signal 111 at 300 to 1100 Hz recognizable by human ears. The modulator 120 modulates the digital signal 111 and hence produces the AM signal 121 and the FSK signal 122. The PLL unit 130 mixes the AM signal 121 with the FSK signal 122, and hence provides the output signal 131, an analogue signal. Then, the PLL unit 130 sends the output signal 131 to the antenna 160 through the amplifier 140 and the filter 150. Finally, the antenna 160 transmits the output signal 131.

As discussed above, the output signal 131 includes the AM signal 121 and the FSK signal 122. From a long distance, a radio receiver can receive the AM signal 121 included in the output signal 131, and a related direction finder can determine the direction of the output signal 131. The AM signal 121 helps a rescue team choose a direction to go, trying to find a survivor or body carrying the alternate radio transmitter. The AM signal 121, which is not precise, helps the rescue team approach the survivor or body although it does not enable the rescue team to precisely locate the survivor or body.

The FSK signal 122 included in the output signal 131 includes frequencies F1 and F2. The frequency F1 represents "0" while the frequency F2 represents "1." Hence, the FSK signal 122 carries the GPS data 101, i.e., the data of the precise location of the survivor or body. The FSK signal 122 helps the rescue team precisely locate the survivor or body.

Figure 2:
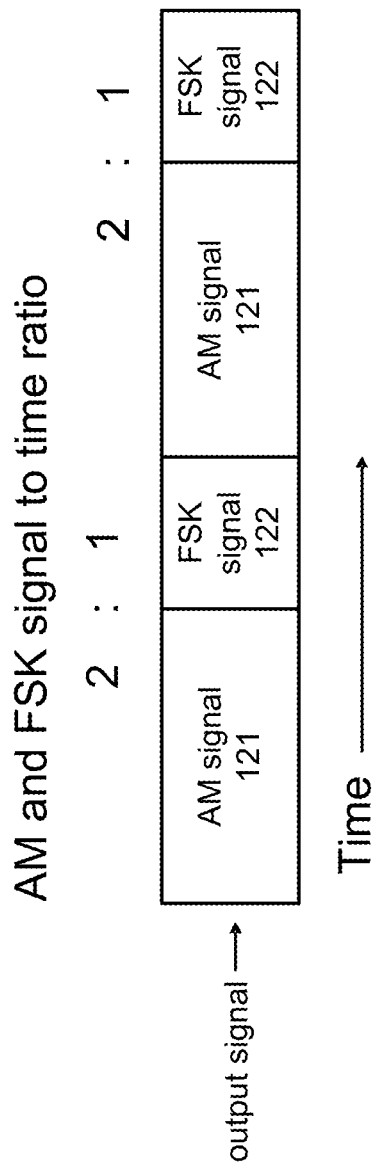
FIG. 2 shows components of a signal transmitted from the alternate radio transmitter shown in FIG. 1.

Referring to FIG. 2, there are shown components of the output signal 131. In the PLL unit 130, the output signal 131 is produced by mixing the AM signal 121 with the FSK signal 122. The AM signal 121 is mixed with the FSK signal 122 at a time ratio of 2:1. The time period of the AM signal 121 is twice as much as that of the FSK signal 122. The precision of the receipt of the AM signal 121 is lower than that of the FSK 122; however, the AM signal 121 can be received farther than the FSK signal 122. Therefore, in rescuing, the AM signal 121 is used as the primary signal while the FSK signal 122 is used as an auxiliary signal.

Figure 3:
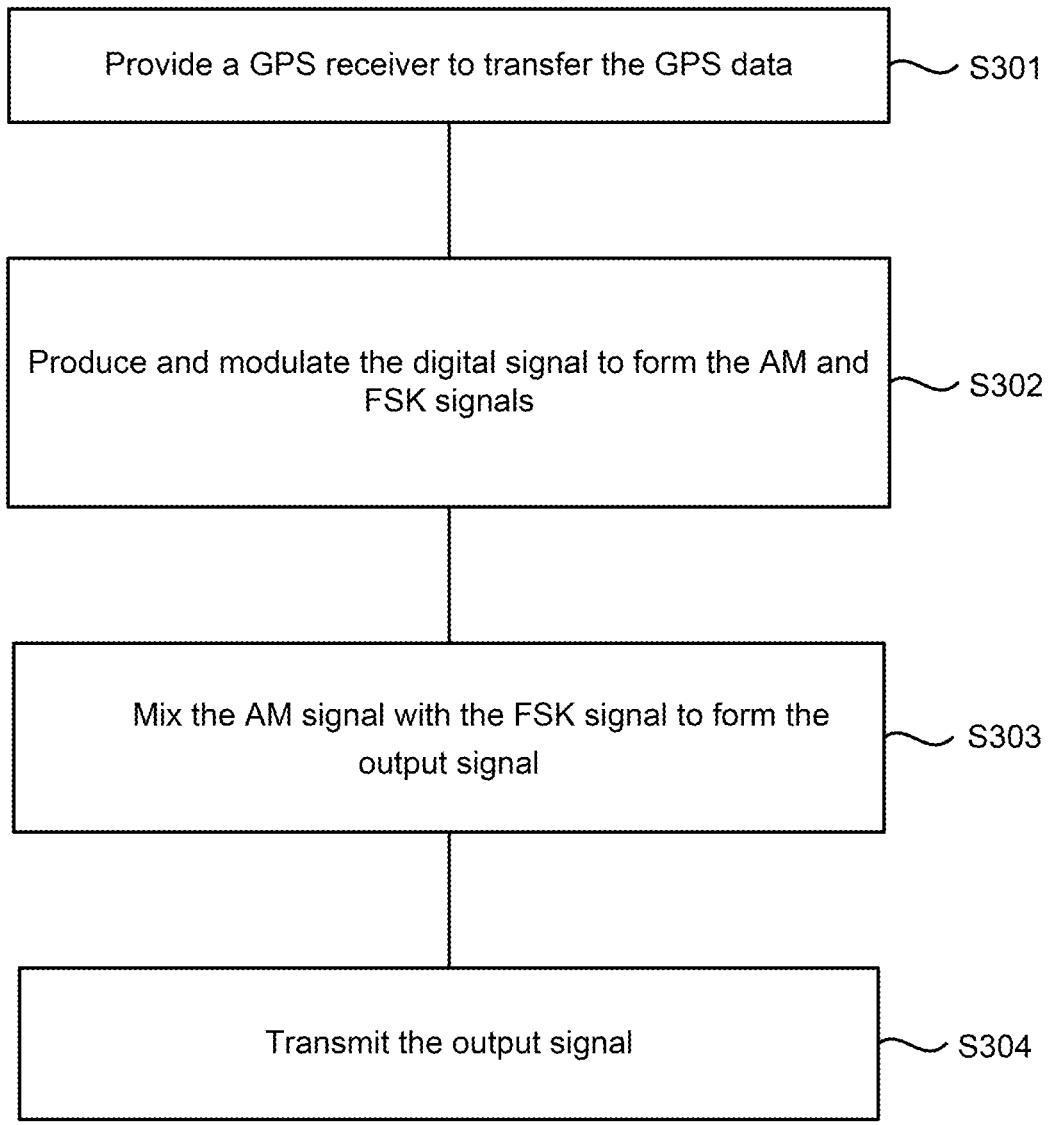
FIG. 3 is a flow chart of a method for operating the alternate radio transmitter shown in FIG. 1 according to the second embodiment of the present invention.

Referring to FIG. 3, there is shown a method for operating the alternate radio transmitter shown in FIG. 1. At S301, the GPS receiver 100 receives the GPS data 101 and sends the GPS data to the processor 110. The GPS data 101 includes the positioning data such as the precise location of a victim in a sea wreck.

At S302, the processor 110 produces the digital signal 111 including the GPS data 101 and sends the digital signal 111 to the modulator 120. The modulator 120 modulates the digital signal 111, and hence produces the AM signal 121 and the FSK signal 122. The modulator 120 sends the AM signal 121 and the FSK signal 122 to the PLL unit 130.

At S303, the PLL unit 130 mixes the AM signal 121 with the FSK signal 122, and therefore produces the output signal 131. The PLL unit 130 sends the output signal 131 to the antenna 160.

At S304, the antenna 160 transmits the output signal 131 by radio.

Figure 4:
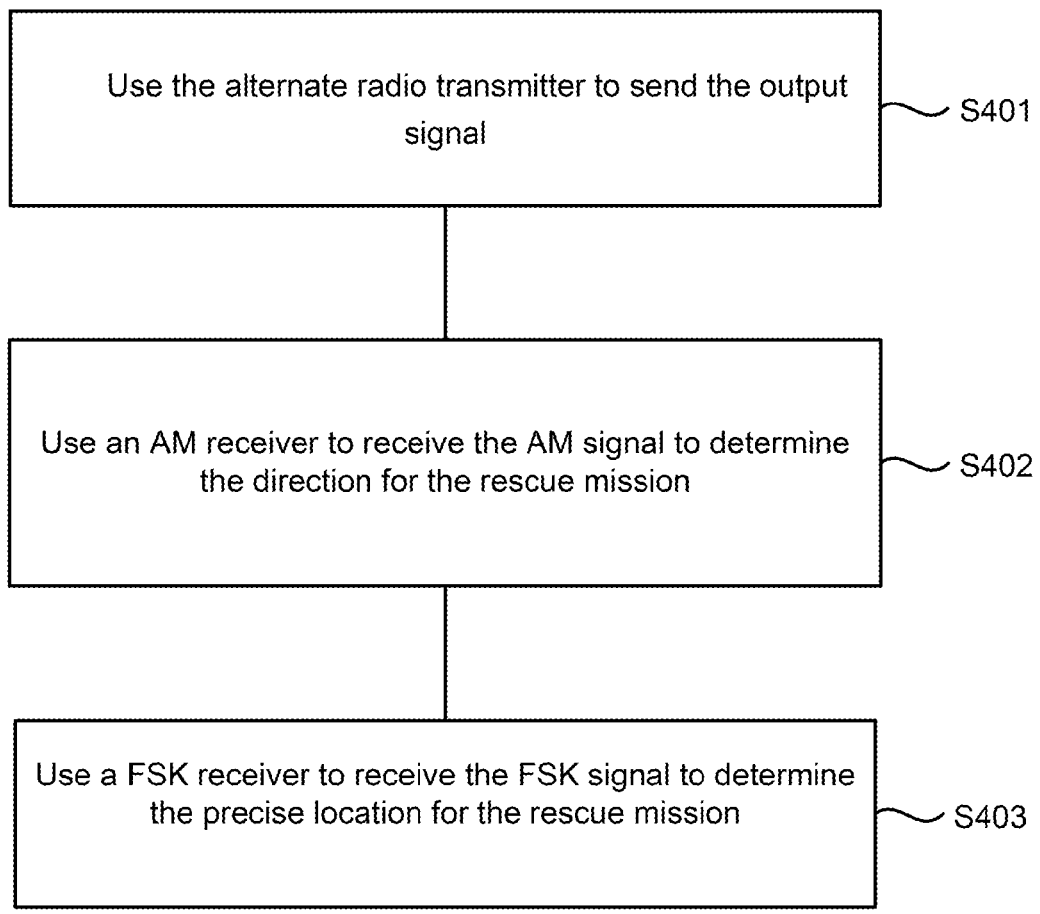
FIG. 4 is a flow chart of a method for executing a rescue mission by using the alternate radio transmitter shown in FIG. 1 according to the third embodiment of the present invention.

Referring to FIG. 4, there is shown a method for executing a rescue mission by using the alternate radio transmitter shown in FIG. 1. At S401, the rescue team uses the alternate radio transmitter to send the output signal 131, including the AM signal 121 and the FSK signal 122, asking for help.

At S402, still far from the survivor or body, the rescue team uses an AM receiver to receive the AM signal 121 included in the output signal 131 to determine the direction for the rescue mission. The rescue team derives a received signal strength indicator ("RSSI"), and approaches the survivor or body base on the RSSI.

At S403, in a short range from the survivor or body, the rescue team uses a FSK receiver to receive the FSK signal 122 included in the output signal 131. The FSK signal 122 includes the GPS data 101. The rescue team precisely locates the survivor or body based on the GPS data 101.

As discussed above, the alternate radio transmitter can be used by the rescue team to quickly and precisely locate the survivor or body in the rescue mission. Moreover, the alternate radio transmitter is useful in putting out a fire, monitoring a beach, monitoring an oil well, monitoring a tourist attraction, scenic spot, monitoring a theme part and etc.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:
1. An alternate radio transmitter including:
a processor for providing a digital signal;
a modulator for modulating the digital signal into an amplitude modulated (AM) signal and a frequency shift keyed (FSK) signal, thus providing at least two modulated signals;
a PLL unit for mixing the modulated signals, thus providing an output signal; and
a radio transmission unit for transmitting the output signal.
2. The alternate radio transmitter according to claim 1, including a GPS receiver for receiving GPS data and sending the GPS data to the processor.

3. The alternate radio transmitter according to claim 1, wherein the AM signal is mixed with the FSK signal at a time ratio of 2:1.

4. The alternate radio transmitter according to claim 2, wherein the FSK signal includes the GPS data.

5. A method for operating an alternate radio transmitter including the steps of:
- providing a GPS receiver for receiving GPS data;
- providing a processor for receiving the GPS data and providing a digital signal including the GPS data;
- providing a modulator for modulating the digital signal into an amplitude modulated (AM) signal and a frequency shift keyed (FSK) signal, thus providing at least two modulated signals;
- providing a phase-locked loop (PLL) unit for mixing the modulated signals, thus providing an output signal; and
- providing a radio transmission unit for transmitting the output signal.

6. The method according to claim 5, wherein the AM signal is mixed with the FSK signal at a time ratio of 2:1.

7. The method according to claim 5, wherein the FSK signal includes the GPS data.

8. A method for executing a rescue mission including the steps of:
- using the alternate radio transmitter according to claim 1 to send an output signal for help, wherein the output signal includes the AM signal and wherein the FSK signal includes GPS data;
- using an AM receiver to receive the AM signal to determine a direction for the rescue mission; and
- using an FSK receiver to receive the FSK signal to determine a precise location for the rescue mission.

\* \* \* \* \*